Figure 5:
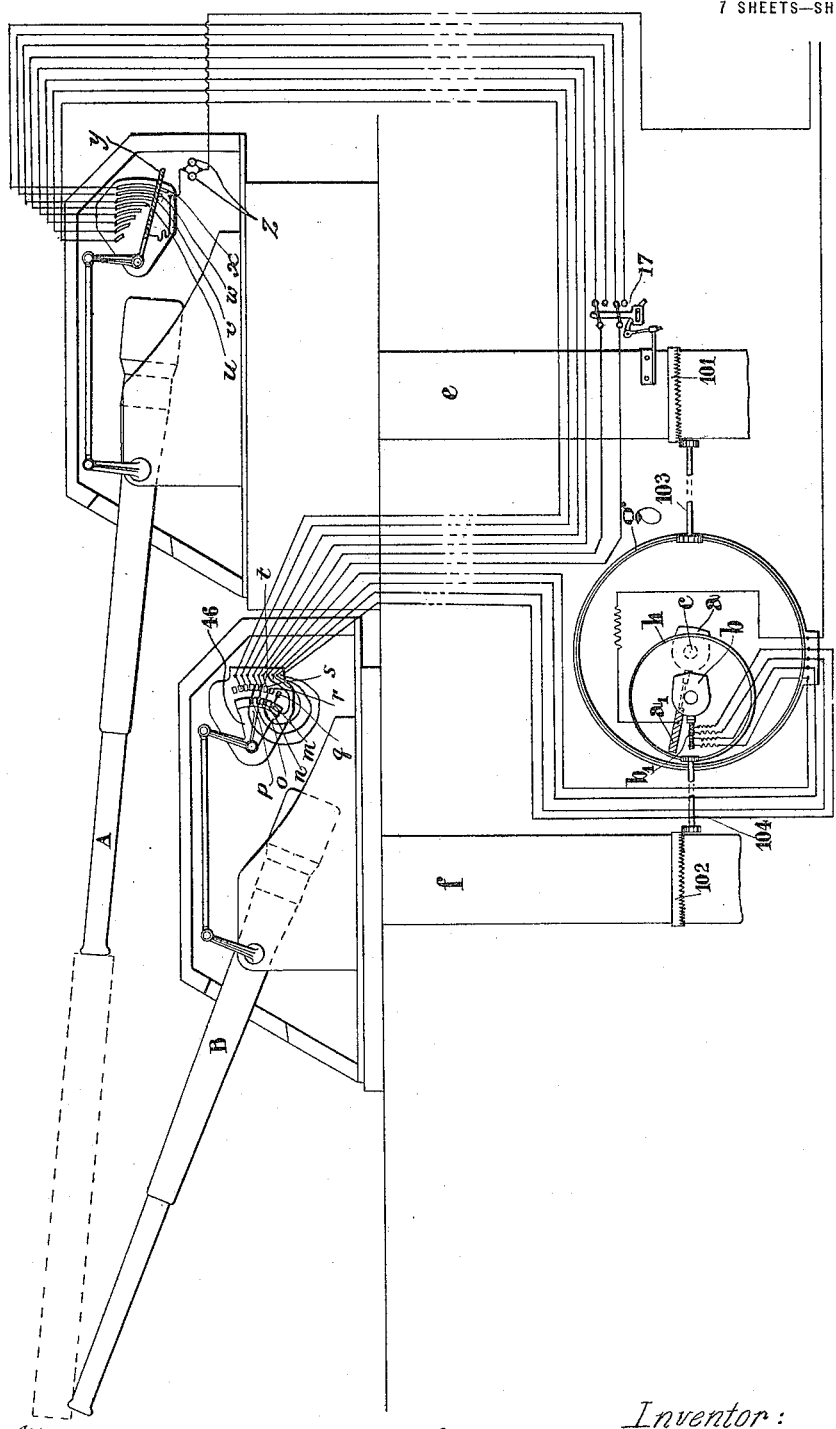

W. D. KILROY.
AUTOMATIC POSITION INDICATOR FOR GUNS.
APPLICATION FILED MAY 26, 1910.
1,158,233.
Patented Oct. 26, 1915.
7 SHEETS—SHEET 1.
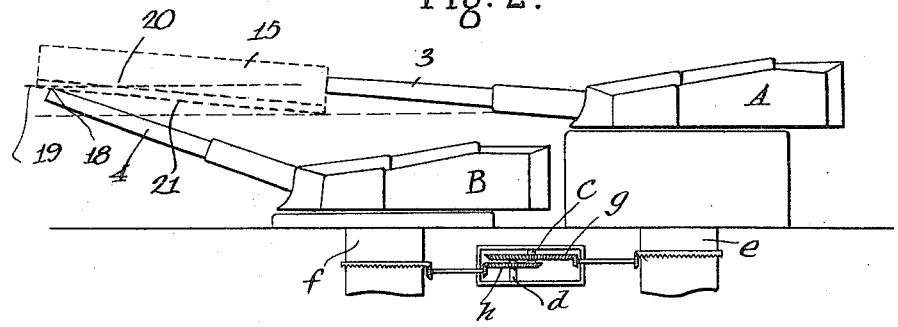
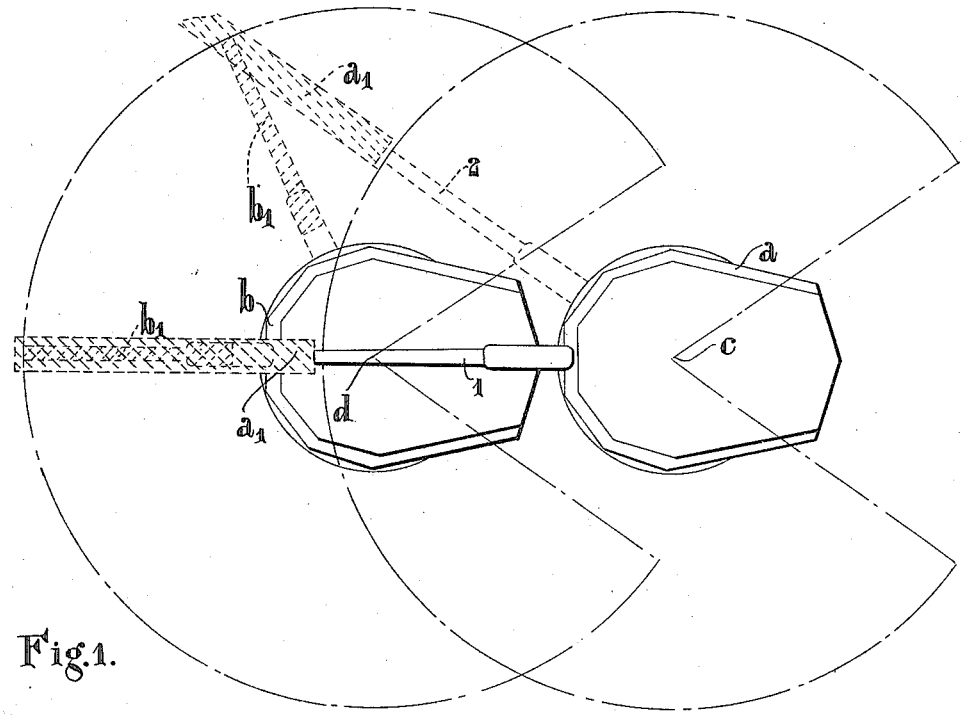
Inventor,
Willie D. Kilroy,

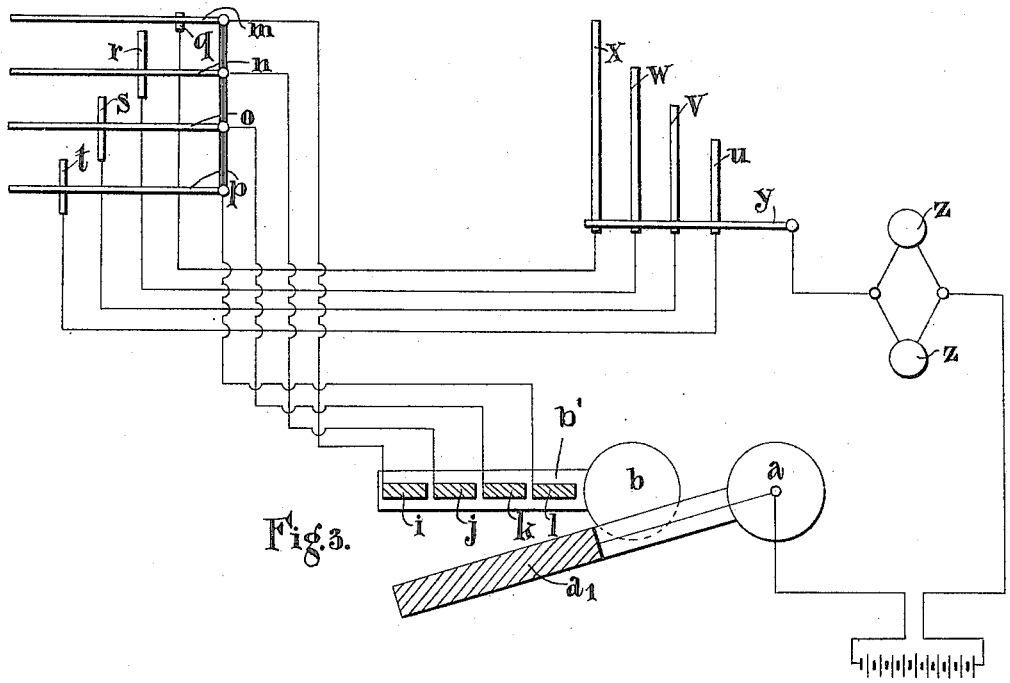

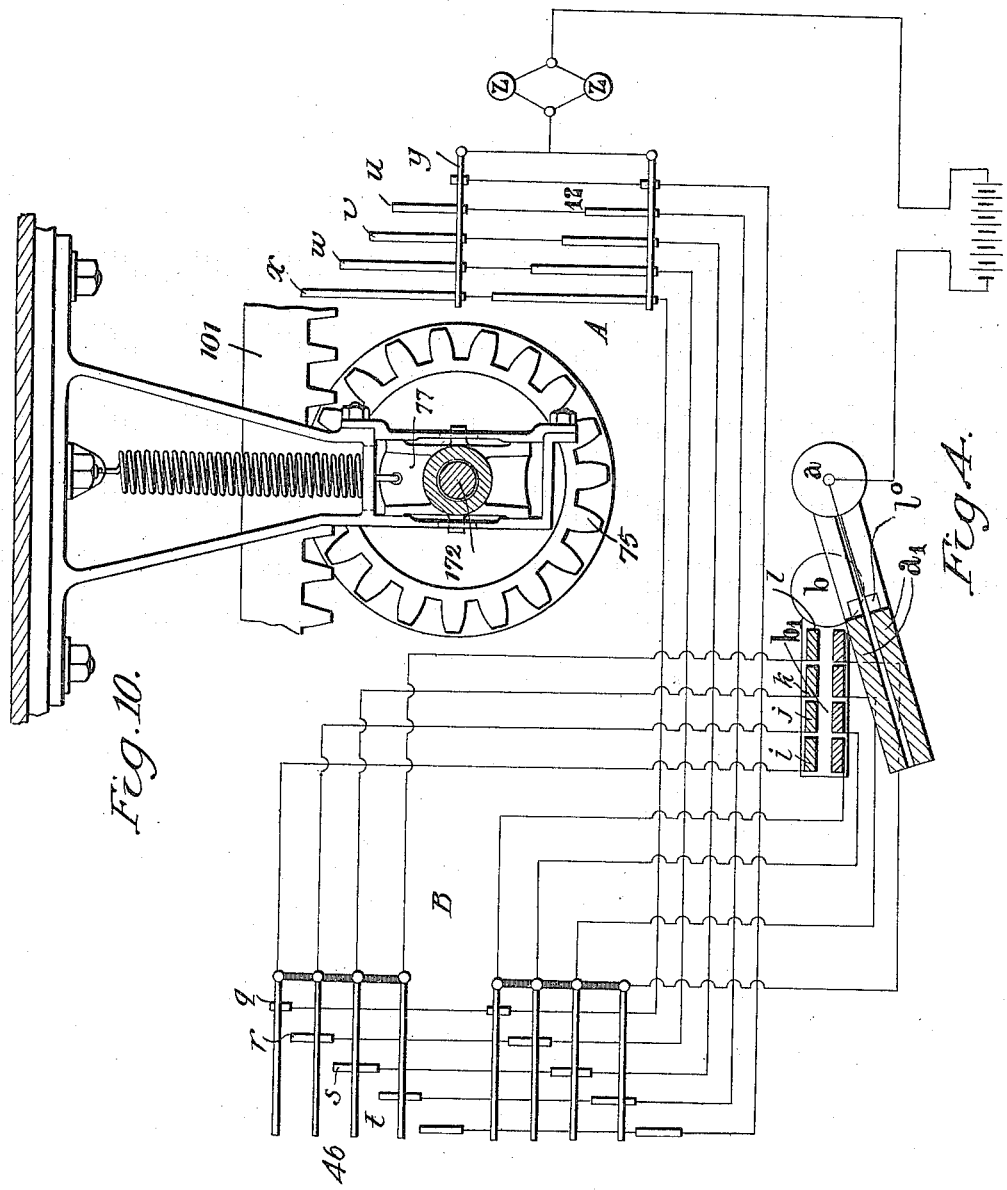

W. D. KILROY.
AUTOMATIC POSITION INDICATOR FOR GUNS.
APPLICATION FILED MAY 26, 1910.

1,158,233.

Patented Oct. 26, 1915.
7 SHEETS—SHEET 4.

Witnesses
C. E. Parsons
Ewd L. Johson

Inventor:
Willie D. Kilroy
By Spear, Middleton, Donaldson & Spear Attys.

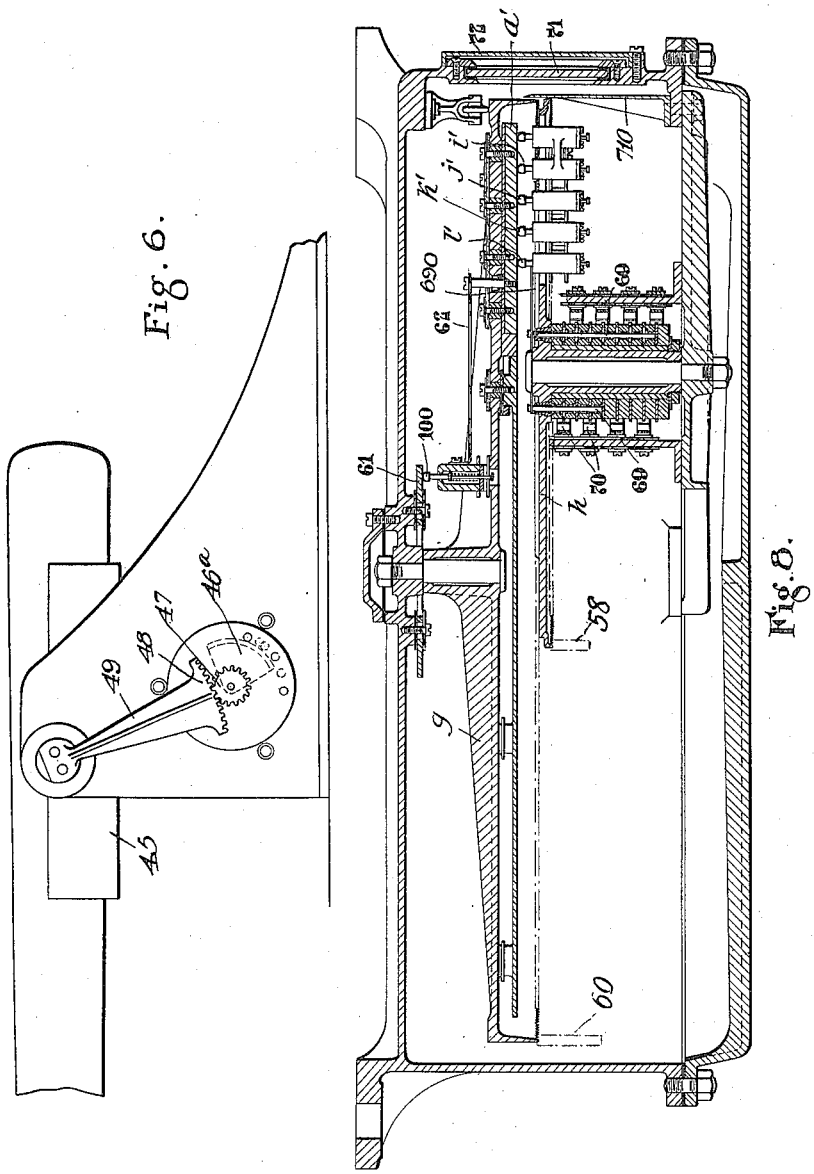

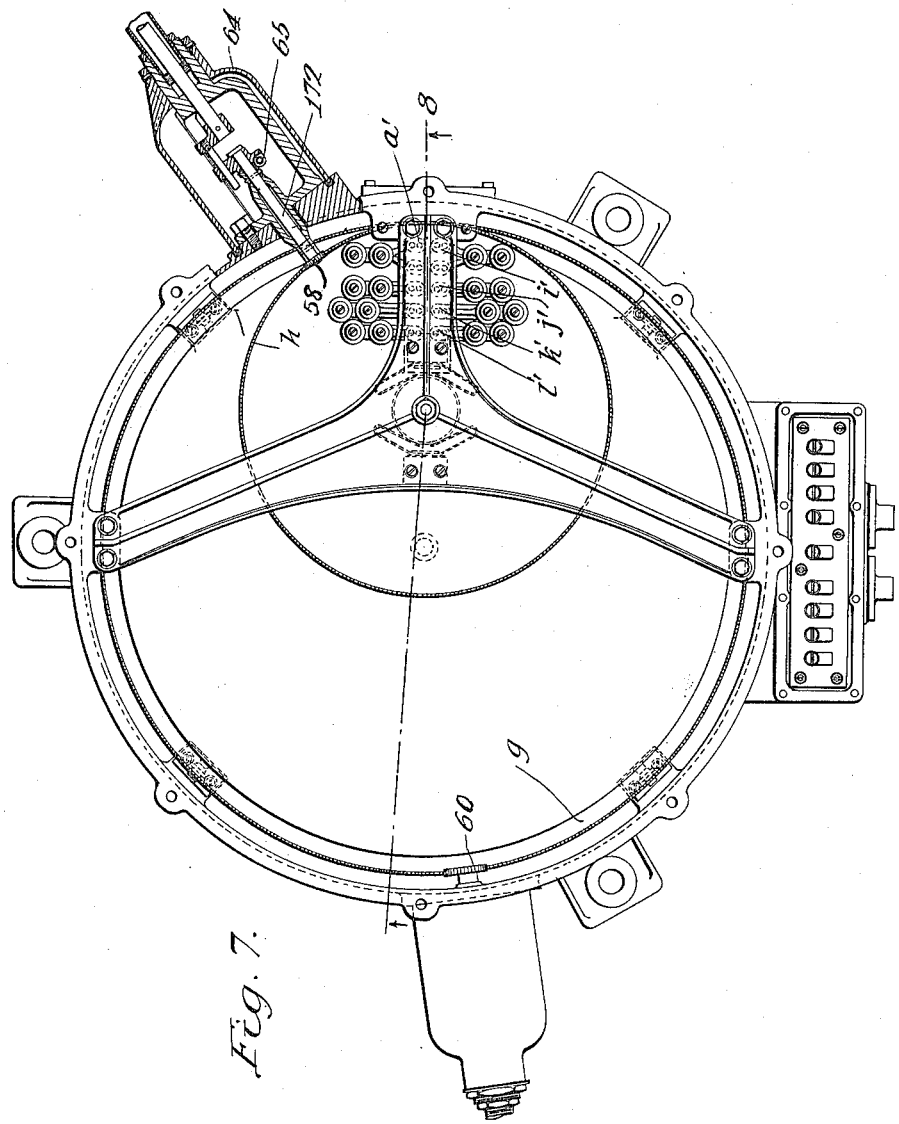

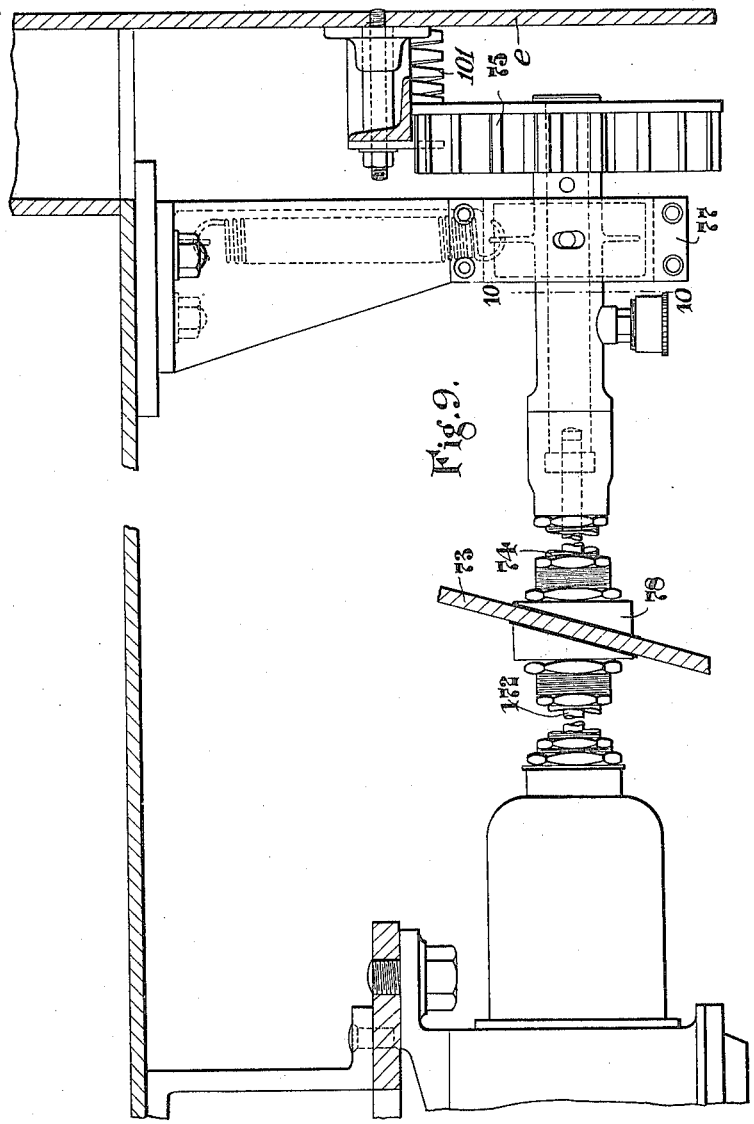

UNITED STATES PATENT OFFICE.

WILLIE DICKSON KILROY, OF CHISWICK, ENGLAND.

AUTOMATIC POSITION-INDICATOR FOR GUNS.

1,158,233.  Specification of Letters Patent.  Patented Oct. 26, 1915.

Application filed May 26, 1910. Serial No. 563,643.

*To all whom it may concern:*

Be it known that I, WILLIE DICKSON KILROY, a subject of the King of Great Britain and Ireland, and residing at Acton Lane Works, Chiswick, in the county of Middlesex, England, have invented a certain new and useful Automatic Position-Indicator for Guns, of which the following is a specification.

This invention relates to the automatic indication of certain relative positions of guns or the like, such as, for example, endangering positions of firing where, should a gun be fired, it might damage another gun or other object which it is not desired to damage, or cause a blast which would have injurious effect.

The object of the present invention is to obtain improved means for this purpose which shall be simple and reliable in action.

The invention in brief consists in a system of danger and like indication including in combination a plurality of guns, one capable of endangering another, representations to a reduced scale of the endangering area of the first gun and of the area of the part of the second gun capable of endangerment by the first gun, said representations comprising electrical contacts hereinafter referred to as endangering and endangered contacts respectively; an electric circuit including a signal, said contacts forming a switch in said circuit, said representations being adapted to copy the training motion of the guns respectively and two independent switches included in said circuit, each of said switches adapted to be operated by the elevating motion of one of the guns.

This invention is applicable to guns of all sizes mounted singly or in twin or other mountings, and is especially useful in connection with the guns on modern warships when, owing to their great range of action, both as regards training, elevation and depression, it becomes extremely important to provide an efficient yet simple method of giving indication of danger which does not unnecessarily restrict the firing of the guns.

Referring to the accompanying diagrammatic drawings; Figure 1 represents in plan a training model with endangering and endangered contacts $a'$ and $b'$, Fig. 2 shows an elevation of two guns A and B elevated above the horizontal the gun A having for the purpose of explanation when the figure is considered to represent a model, an endangering contact attached thereto; Fig. 3 represents electrical connections according to one construction when the gun A may be endangering B; Fig. 4 represents a diagram of connections applied in one way to twin mountings; Fig. 5 shows diagrammatically a complete arrangement for two guns according to one form of the invention, the guns with their turrets being shown in elevation and the tables carrying the training models or representations for convenience being shown in plan; Fig. 6 illustrates a construction of elevation switch with external gearing; Fig. 7 is a plan view looking from below and Fig. 8 a part sectional elevation of one construction including endangering and endangered contacts according to the present invention; Fig. 9 is a part sectional view, and Fig. 10 a section on the line 10/10 of Fig. 9 of a form of operating gear for the training of a model.

In Fig. 1 $a$ and $b$ are representations both as to scale and position of two gun mountings carrying respectively electrical contacts $a'$ and $b'$. The former represents the endangering area of a gun such as A (Fig. 2) and the latter the area of a gun such as B (Fig. 2) capable of endangerment by the first mentioned gun.

The representations or models $a$ and $b$ are arranged to be moved as regards training in the same degree as the guns, the former being pivoted at the point $c$ and latter at $d$. (See Fig. 1.) This can conveniently be effected as diagrammatically illustrated in Fig. 2 by mounting them respectively on the tables $g$ and $h$, provided with geared edges which are driven by gearing from the trunks $e$ and $f$ of the guns A and B.

In operation as the guns are trained so the model guns are also trained and in positions where the gun A might endanger the gun B contact is made at the parts $a'$ and $b'$. It may be that although the guns are in positions as regards training in which one might endanger the other, yet the elevation may be such that there is no risk of this danger.

Fig. 3 illustrates a scheme for taking elevation into account as well as training. In this case arm $y$ and segment arm 46 are moved in any suitable manner (see below with reference to Fig. 5) across contacts $u$—$x$ and $q$—$t$ respectively as the guns are elevated or depressed. Electrical leads join the contacts $u$—$x$ to the contacts $t$—$q$ respectively as illustrated. In addition electrical connections are made from the arm $y$ by way of signals $z$ and a source of electric supply to the contacts $a'$ and from the contact $b'$ to the segment arm 46.

In operation assuming that the models are in the position indicated either by 1 or by 2 in Fig. 1 contact would be made at $a'$ and $b'$ but no signal would be given in the indicators $z$ unless both the arms $y$ and 46 were in such position that the electrical circuit would be completed by way of the leads joining the contacts $u$—$x$ to the contacts $t$—$q$. In other words the arrangement takes into account both elevation and training. If the elevation and training were such that danger conditions as regards one gun with respect to another were present then notice would be given by the indicator $z$. If not no notice would be given.

Fig. 4 shows a scheme altered as regards two particulars as compared with Fig. 3. In the first place the arrangement is to be applied to a twin mounting so that the contacts $a'$ and $b'$ are duplicated and the same applies to the elevation switches. The contacts $a'$ are joined by a lead $l_0$. The other difference applies to the contacts $b'$ which are divided into four parts. This alteration involves the use of four fingers $m$, $n$, $o$, $p$ carried on the segment 46 corresponding to each gun mounting and electrical leads are taken from these arms to the contacts as illustrated. The reason of the division of the contacts is to prevent to a considerable extent unnecessary restriction of firing. The arrangement illustrated assumes that both guns in a twin mounting are depressed or elevated in an equally dangerous position as the more dangerous of the two. Such an assumption is not essential to constructions according to the present invention but it is one which may generally be adopted.

A complete system for single gun mountings and including a divided contact $b'$ is shown in Fig. 5 in which the elevation switch of the gun B comprises a sector 46 carrying contact fingers $m$, $n$, $o$, $p$, etc., which pass over electrical contacts $q$, $r$, $s$, $t$, etc., connected as shown with a series of contacts $x$, $w$, $v$, $u$, etc., in connection with the gun A. The number of these contacts electrically connected together is determined by the position of a movable contact arm $y$ carried on the gun A so as to be moved when the latter is elevated or depressed. The electric circuit is derived from any suitable source of current supply, passes through the indicator $z$ to the movable contact arm $y$, which passes over the contacts $x$, $w$, $v$, $u$, etc., thence to the contacts $q$, $r$, $s$, $t$, etc., through segment 46, carrying the contact fingers $m$, $n$, $o$, $p$, etc., thence to the contacts $i$, $j$, $k$, $l$, carried on $b'$, of the gun model, and when $a'$ contacts with $b'$ back to the other side of the supply source. The training motion of the guns A and B is communicated by the trunks $e$ and $f$ and racks 101, 102 to the tables $h$ and $g$ respectively, through gearing 103 and 104. On the tables are mounted the models corresponding to the path of the projectile plus minimum clearance $a'$ in respect of gun A and the divided contact $b'$ corresponding to the part of gun B capable of endangerment by gun A. By this means a model in plan of the endangered part of one gun and the endangering zone of the other gun is obtained which copies the training of the guns. As regards elevation, a sector 46 is moved with the gun B and has contact arms which pass over the series of contacts $q$, $r$, $s$, $t$, etc., electrically connected with another series of contacts $x$, $w$, $v$, $u$, etc., in connection with the gun A.

A change-over switch 17 operated by a cam on the trunk $e$ is interposed in the conducting wires connecting the contacts, $x$, $w$, $v$, $u$, etc., with the contacts $q$, $r$, $s$, $t$, etc., and is adapted to be operated by means of a bell crank lever operated by the training of the guns. By this means the various contacts can be thrown operatively into the circuit and consequently the range of elevation is thereby extended or diminished. The reason for the use of a switch such as 17 is that for different positions of training different ranges of elevation and depression can be given to a gun without causing dangerous firing as regards another gun. This can be understood from Fig. 2 in which for purposes of explanation an area 20 has been drawn on to the muzzle of the gun A, part being shaded and part unshaded. The shaded area represents the path of the projectile from the gun A together with the necessary clearance to prevent endangerment of the gun B by a hot blast if the guns be in the position as regards elevation shown in Fig. 2 and if as regards training they be in a position corresponding with the position of the training models indicated by 1 in Fig. 1. Then no danger condition is present. If the guns are trained to a position corresponding to that of the training models indicated by 2 in Fig. 1 then the muzzle of the gun B would be liable to be endangered by gun-fire from the gun A. Thus while the guns were trained in the position indicated by 1 an area corresponding to the shaded part would properly represent an endangering area yet for a training position corresponding to 2 the area would have to be increased by the addition of an amount equal to the unshaded part. This addition is automatically effected according to the arrangement of Fig. 5 by the change-over switch 17 which brings into action contacts of different lengths as required according to the training of the gun A.

Certain mechanical details of construction are illustrated in the remaining drawings, viz:—Figs. 6–10.

Fig. 6 shows how a sector such as 46ª can be operated through gearing as the gun is elevated or depressed. The sector is mounted on the spindle of a pinion 47 in gear with a circular rack 48 mounted on an arm 49 connected with the gun cradle 45.

Figs. 7 and 8 illustrate how the training models or representations can be arranged. In these figures the endangering contact $a'$ is carried on the disk $g$ and rotated by the pinion 60 geared as through shafting to the endangering turret. The endangered contacts (assuming a twin mounting) are formed by two sets of plungers $i'$, $j'$, $k'$, $l'$, carried on the disk $h$ which is rotated by the pinion 58 driven from the endangered turret. The disk $g$ is connected for the reception of current by a spring contact 100 pressing against a stationary plate 61. The current passes from the contact 100 through a lead 62 to the contact $a'$. Current passes from the contacts $i'$, $j'$, $k'$, $l'$ by way of strips 690 and brass rods 69 of different lengths to brushes 70, thence by way of suitable connections in the same manner as indicated in Fig. 5.

In the construction illustrated a glass window 71 is provided having a removable gun metal cap 72 so that the setting of the tables may be examined. The setting is indicated by a pointer 710 and a scale of training which is placed around both tables. If the setting be not correct, that is if the training of the guns does not correspond to the training indication on both tables then the table with the wrong training is rotated by removing a cover 64 (shown in connection with the table $h$) and turning a worm 65. This worm is of slow pitch so that although it can be turned to vary the setting of the tables it properly transmits rotation from the turret to the tables.

A method of driving the pinions 58 and 60 from their respective turrets is shown in Figs. 9 and 10 comprising a shaft 172 which passes through a bulkhead 73 and is there provided with a watertight joint indicated by 78. The shaft is protected by steel tubing 74, is mounted in a spring bracket 77 and rotated by the rack and pinion 101, 75, in the case of trunk $e$.

In this specification and claims I wish it to be understood that I do not limit myself to guns endangered by other guns but include fixed or movable objects which may be in or may pass into the danger zone of one or more guns, so that for example one model may represent an endangering gun operating with a model of the object required to be protected.

The endangering or endangered contacts may be enlarged to any desired extent beyond the real area of danger, in order to give the desirable factor of safety.

It will be understood that danger indications of any suitable kind can be given according to the present invention whether by sound, visual indications, or any other desired kind, and wherever the words "signal" or "danger indications" or "danger signal" occur in this specification or claims they are to be understood as including suitable indication of any desired kind whatever, and they may include, for example, in the system where the indicator $z$ is shown, or at any other suitable place, motors for operating indications, or for effecting control of dangerous firing in any other desired manner.

Having now described my invention what I claim as new and desire to secure by Letters Patent is:—

1. A system of danger and like indication including in combination a plurality of guns one capable of endangering another, representations to a reduced scale of the endangering area of the first gun and of the area of the part of the second gun capable of endangerment by the first gun, said representations comprising electrical contacts, an electric circuit including a signal, said contacts forming a switch in said circuit, said representations adapted to copy the training motion of said guns respectively and two independent switches included in said circuit, each of said switches adapted to be operated by the elevating motion of one of the guns, substantially as described.

2. A system of danger or like indication including in combination a plurality of guns one capable of endangering another, model equivalents adapted to copy one motion of the said guns, an electric circuit in which said models operate as a switch, said circuit including danger indicating means and separately operated switches adapted to be moved by the other motion of said guns.

3. A system of danger and like indication including two guns, one capable of endangering the other, models of the respective guns arranged in proximity to each other, one of said models being provided with a contact strip representing the endangered area of the second gun and the other being provided with a similar contact strip representing the endangering area of the first gun, means adapted to move said models to copy the training motion of the respective guns, an electric circuit including said models, a danger indicating signal and movable contacts operated by the elevating motion of said guns, all included in said circuit, substantially as described.

In testimony whereof, I affix my signature in presence of two witnesses.

WILLIE DICKSON KILROY.

Witnesses:
P. A. OUTHWAITE,
G. F. WARREN.

Copies of this patent may be obtained for five cents each, by addressing the "Commissioner of Patents, Washington, D. C."